July 11, 1967          L. L. LEWIS          3,330,504

LOCKING DEVICE FOR AIRCRAFT CONTROLS

Filed Feb. 16, 1966

*INVENTOR.*
LEONARD L. LEWIS
BY *Elliott & Pastoriza*
*ATTORNEYS*

United States Patent Office 3,330,504
Patented July 11, 1967

3,330,504
LOCKING DEVICE FOR AIRCRAFT CONTROLS
Leonard L. Lewis, 3304 Airport Ave.,
Santa Monica, Calif. 90405
Filed Feb. 16, 1966, Ser. No. 527,936
2 Claims. (Cl. 244—83)

ABSTRACT OF THE DISCLOSURE

This disclosure relates to a T-shaped member for locking the cockpit pedal and wheel controls of an aircraft. The cross portion of the T engages the pedals in the cockpit and the leg of the T is formed of telescoping tubes such that its overall length may be adjusted. The extreme end of the leg of the T terminates in a yoke structure arranged to engage the wheel in the cockpit when the wheel is moved out to its furthest position from the pedals. A clutch structure locks the telescoping tubes in their extended positions so that the T member effectively prevents movement of the pedals and wheel thereby locking the external control surfaces of the aircraft.

---

Figure 1:
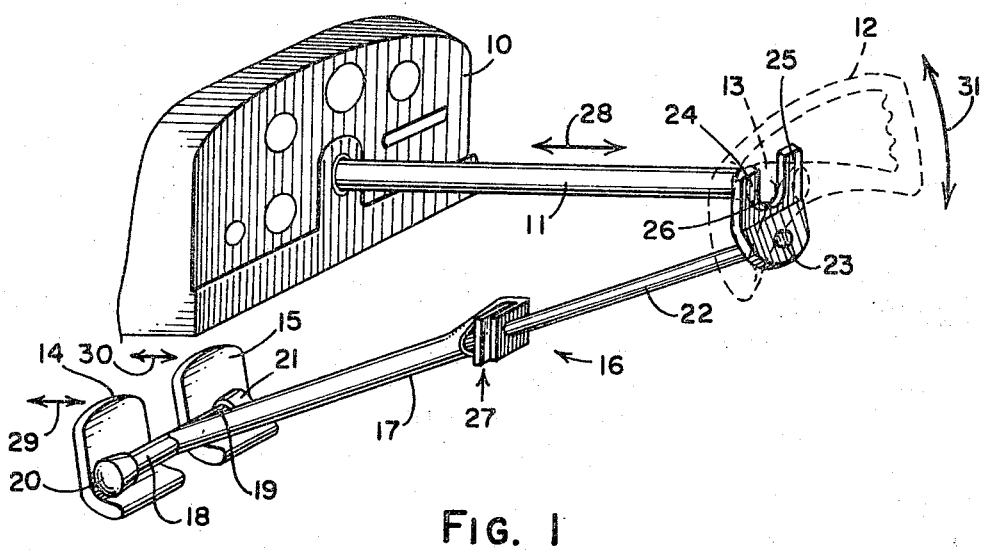

This invention relates generally to auxiliary devices for use with aircraft and more particularly to an improved locking device for holding the cockpit pedal, aileron, and elevator controls stationary.

Most conventional light aircraft used by private pilots employ two pedals for controlling the rudder of the aircraft and a stick or wheel and shaft structure for controlling aileron and elevator control surfaces of the aircraft. Many of these planes are simply tied down at an airport rather than hangared and are thus subject to gusts of wind and the like. These gusts of wind act on the aileron and rudder as well as the elevators and can cause them to flap or oscillate unless the control surfaces are locked in some manner. Such flapping, of course, is undesirable since it will wear the control cables leading from the internal cockpit controls to the external control surfaces as well as the pivot and hinging structures for the control surfaces themselves.

Heretofore, clamp blocks externally applied to the control surfaces have been employed to hold the surfaces in a stationary condition. However, these blocks are troublesome to install and necessitate walking about the airplane from one wing to the other and to the tail structure. Furthermore, if a pilot should forget to remove the clamp blocks, the internal cockpit controls are useless to control the airplane, and many accidents have been a direct result of this oversight.

Other proposed means as a substitute for clamping blocks include simple pins for locking the aileron and elevator control wheel shaft in the cockpit. However, the pedals of the aircraft are still free and thus the rudder is free to flap and, again, to prevent such, an external type clamping block has been deemed necessary With the foregoing considerations in mind, it is a primary object of the present invention to provide a vastly improved locking device for locking aircraft cockpit controls in such a manner that all of the controls, including the pedals, are held in a stationary position to the end that the external control surfaces are prevented from moving in gusts of wind and the like.

More particularly, it is an object to provide a locking device which is extremely light, relatively small and portable, and yet adjustable to many different types of aircraft such that a single locking device may universally be used on several different aircraft, thereby avoiding the necessity of providing a special locking device tailored to each type airplane.

Another important object is to provide a locking device which does not require any tools to effect the locking operation or releasing operation so that overall use of the device is extremely simple and yet functions to realize the desired ends of preventing external movement of the control surfaces.

Still another object is to provide a device for locking all of the aircraft controls from within the cockpit so that there is no risk of flying the airplane with the locking device still in place.

Briefly, these and many other objects and advantages of this invention are attained by providing a locking device in the form of a T-shaped structure. The T-shaped structure includes means for varying the length of the leg of the T in such a manner that the overall length of this leg may be adjusted to a distance corresponding to the distance between the aircraft pedals and wheel. The T-shaped structure also includes a wheel hub engaging means at the end of the leg of the structure so that the cross of the T may be positioned against the pedals of the aircraft with the leg of the T extending upwardly towards the wheel. The wheel and shaft are pulled rearwardly to their furthest position and the hub engaging portion at the end of the leg of the T urged into engagement with the hub. The result is that the wheel and shaft as well as the pedals are all held in a stationary position simultaneously by the single application of the T-shaped structure.

Figure 2:
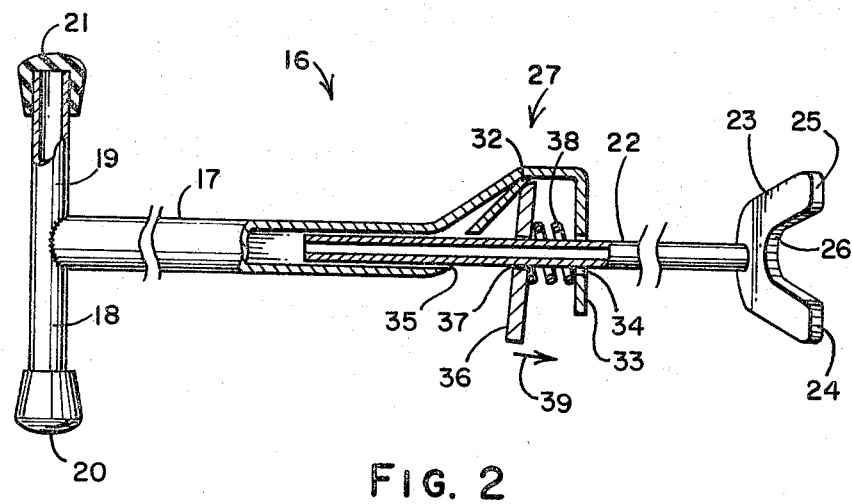

A better understanding of the invention will be had by now referring to a preferred embodiment thereof as illustrated in the accompanying drawings, in which:

FIGURE 1 is a fragmentary perspective view of a portion of an aircraft cockpit illustrating aircraft controls in locked position by means of the locking device of this invention; and, FIGURE 2 is a plan view partly broken away to illustrate certain portions in cross section of the locking device of FIGURE 1.

Referring first to FIGURE 1, there is shown a portion of an aircraft instrument panel 10 from which a wheel shaft 11 extends terminating in a wheel 12 having a hub 13 at the end of the shaft 11. Also illustrated are conventional pedals 14 and 15 for the aircraft.

The ailerons of the aircraft are conventionally controlled by rotating the wheel 12 about the axis of the shaft 11; the elevators are controlled by inward and outward movement of the wheel and shaft 11; and the rudder is controlled by back and forth movement of the pedals 14 and 15. The pedals 14 and 15 may also be capable of compound movements to provide toe brakes, all as is well known in the art.

In order to lock the pedal, aileron, and elevator controls to prevent external movement of the corresponding control surfaces, the locking device of this invention is employed. As shown, this device is designated generally by the numeral 16 and is in the form of a T-shaped structure, the leg of the T being made up of a first elongated member such as a tube 17. At the end of the tube 17, there are provided lateral projecting portions 18 and 19 which define the cross of the T shape and constitute pedal engaging means. The extreme ends of these lateral projections 18 and 19 terminate in rubber end covers such as indicated at 20 and 21.

The leg of the T also includes a second elongated member 22 preferably tubular shaped and arranged to telescope within the first elongated member 17. By this telescoping arrangement, the overall length between the ends of the first and second tubes 17 and 22 may be adjusted to a distance corresponding to the distance between the pedals and the wheel hub 13 when the wheel is pulled back to its furthest extent.

As shown, the end of the second elongated tubular member 22 terminates in a yoke structure 23 including yoke arms 24 and 25 defining a cradle portion 26 for receiving the end portion of the shaft 11 at the point it connects to the hub 13 of the wheel 12.

The locking device is completed by a clutch means designated generally by the numeral 27 for locking the telescoping members 17 and 22 in a manner to prevent inward telescoping movement of the second member 22 into the first member 17 so that the members will remain at any adjusted overall length.

It will be evident from the description thus far that the telescoping members 17 and 22 may be adjusted to a proper distance such that the cross of the T structure defined by the portions 18 and 19 engage the pedals 14 and 15 and the yoke structure 23 engages the hub 13 of the wheel when the wheel is pulled backwardly to its furthest extent. Under these conditions, the various controls will be held stationary. Thus, the shaft 11 for the wheel will be locked against inward and outward movement indicated by the arrow 28 since the clutching means 27 prevents inward telescoping movement of the tube 22 with respect to the tube 17 and since further the axis of the elongated members form an acute angle with the axis of the shaft 11. Further, the wheel 12 itself is prevented from rotating about its axis such as indicated by the arrow 31 as a consequence of the frictional engagement of the yoke portion 23 and the yoke arms 24 and 25 against the hub 13 of the wheel.

Referring now to FIGURE 2, details of the clutching means 27 will be described. As shown, the end of the elongated tube 17 receiving the second tube 22 includes a bent portion 32 extending outwarly and thence downwardly into a flat portion 33 having a central opening 34 through which the elongated tube 22 extends. The tube 17 includes a lateral opening 35 at the initiation of the bend for receiving the tube 22 and guiding the same within the tube 17.

The bent portion 32 defines a cradle for one edge of a clutch plate 36 having a central opening 37 through which the tube 22 passes. The plate 36 itself is biased as by means of a coil spring 38 in a leftward direction as viewed in FIGURE 2 but as a consequence of the engagement of its upper edge with the bent portion 32, the plate 36 is caused to tilt so that the central opening 37 clutches the elongated tube 22. This clutching action tends to increase if any force on the tube 22 is exerted in a manner to cause inward telescoping movement thereof within the tube 17. On the other hand, the tube 22 may be moved telescopically outwardly since this motion will tend to move the clutch plate 36 into a position approaching a normal position to the axis of the tubes.

With respect to the foregoing, it will be evident that if the tube 22 is moved outwardly in a telescoping direction too far for installing the device, or in the event it is desired to telescope the members together to release the device, the outer or lower edge of the clutch plate 36 may be manually moved against the spring 38 as in the direction of the arrow 39, thereby causing it to assume a position in which its plane is normal to the axis of the tubes so that the central opening 37 no longer exerts a clutching action on the tube 22 so long as the plate is manually held in this normal position. The tube 22 may then be easily telescoped within the tube 17.

With the foregoing description of the locking device in mind, its overall operation will now be described. Referring once again to FIGURE 1, the wheel 12 and shaft 11 are first pulled outwardly to their furthest extent. The cross portion of the T structure comprising the laterally extending portions 18 and 19 of the locking device are then cradled in the pedals 14 and 15 as illustrated in FIGURE 1. The tube 22 is then pulled outwardly from the tube 17 until its yoke portion 23 engages tightly the inside of the hub 13 of the wheel 12 with the wheel shaft 11 being cradled in the arcuate cradled portion 26 of the yoke. The device may then be released and it will remain in position since the tube 22 is prevented from telescopically moving into the tube 17 by the locking structure 27. In this respect, it should be noted that the acute angle that the elongated members 17 and 22 form with the wheel shaft 11 prevents the yoke structure 23 from dropping away from the wheel since any tendency for the yoke end of the member 22 to move downwardly would be accompanied by a further outward movement, and since the wheel and hub 13 has already been pulled backwardly to its furthest extent, this motion is blocked. Thus, the pedals 14 and 15 and the elevator control shaft 11, as well as the wheel 12, are all held effectively stationary by the locking device.

When it is desired to release the device, a pilot will simply pull backwardly slightly on the clutch plate 36 as described in FIGURE 2, thereby releasing the elongated tube 22 so that it may be retracted or telescopically moved into the tube 17 and the yoke portion 23 removed from the hub 13. Preferably, the elongated tube 22 is telescoped completely within the tube 17 to shorten the overall length of the locking device to its minimum extent for easy storing.

The tubes themselves are preferably formed of aluminum so that the entire structure is light weight.

From the foregoing description, it will be evident that the present invention has provided a greatly improved aircraft control locking device wherein the various objects set forth are fully realized.

What is claimed is:

1. A locking device for locking aircraft cockpit pedal and wheel controls, comprising, in combination: first and second straight elongated tubes telescoping together such that their overall length may be varied to correspond to the distance between at least one pedal of said aircraft and said wheel when said wheel is moved to its furthest position from said pedal; clutching means for holding said tubes against inward telescoping movement after the same have been telescoped outwardly to define said distance; pedal engaging means adjacent to the end of said first elongated tube for engaging the pedal of said aircraft; and wheel engaging means adjacent the end of said second elongated tube for engaging said wheel to thereby hold said pedal and wheel in stationary positions and thereby prevent external movements of the control surfaces of said aircraft, said clutching means including a clutch plate having a central opening through which said second elongated tube passes, said first elongated tube including a bent portion adjacent to its end telescopically receiving said second elongated tube, said plate having an edge cradled in said bent portion; and spring means biasing said plate at an angle to said tubes whereby said central opening clutches said second elongated tube to prevent inward telescoping movement thereof, manual retraction of an opposite edge of said plate to bring its plane into a position normal to the axis of said tubes releasing said second tube so that the same may be telescoped into said first tube whereby said controls may be released.

2. A locking device for locking the two cockpit pedal controls and wheel of an aircraft wherein the wheel has a shaft extending from the instrumental panel in said cockpit, comprising, in combination: first and second straight elongated tubes telescoping together such that their overall length may be varied to correspond to the distance from said pedals to said wheel when said wheel is moved to its furthest position from said pedals; clutching means for holding said tubes against inward telescoping movement after the same have been telescoped outwardly to define said distance; pedal engaging means in the form of laterally projecting portions adjacent to the end of said first elongated tube for simultaneously engaging said pedals; and wheel engaging means comprising a yoke structure defining a cradle for receiving said shaft at the hub of said wheel adjacent the end of said second elongated tube, said tubes forming an acute angle with said shaft to thereby hold said wheel against rotation and said shaft against inward movement so that said pedals and wheel are held in stationary positions to prevent external movements of the control surfaces of said aircraft.

References Cited
UNITED STATES PATENTS

| | | | |
|---|---|---|---|
| 1,707,113 | 3/1929 | Christ | 74—532 |
| 2,671,355 | 3/1954 | Hawkins | 74—532 |
| 3,169,731 | 2/1965 | Phillips et al. | 244—83 |

MILTON BUCHLER, *Primary Examiner.*

A. H. FARRELL, *Assistant Examiner.*